United States Patent [19]

Hsu et al.

[11] Patent Number: 4,614,628
[45] Date of Patent: Sep. 30, 1986

[54] SOLID ELECTROLYTE STRUCTURE AND METHOD FOR FORMING

[75] Inventors: Michael S. Hsu, Lincoln; Charles F. Wilson, Sudbury, both of Mass.

[73] Assignee: Massachusetts Institute of Technology, Cambridge, Mass.

[21] Appl. No.: 631,010

[22] Filed: Jul. 16, 1984

Related U.S. Application Data

[63] Continuation of Ser. No. 382,035, May 26, 1982, abandoned.

[51] Int. Cl.[4] ............................................. C04B 41/87
[52] U.S. Cl. ...................................... 264/61; 264/80; 264/81
[58] Field of Search ........................ 264/81, 61, 27, 80

[56] References Cited

U.S. PATENT DOCUMENTS

| | | | |
|---|---|---|---|
| 2,990,601 | 7/1961 | Wagner | 264/80 |
| 3,052,949 | 9/1962 | Williams | 264/86 |
| 3,460,991 | 8/1969 | White | 136/86 |
| 3,554,808 | 9/1967 | Fischer et al. | 136/86 |
| 3,565,345 | 7/1968 | Moltzon | 264/81 |
| 3,655,425 | 4/1972 | Longo | 264/60 |
| 4,289,447 | 9/1981 | Sterman | 264/81 |
| 4,397,800 | 8/1983 | Suzuki | 264/61 |

OTHER PUBLICATIONS

Durmann, "Plasma Sprayed Alumina-Titania Composite", Ceramic Bulletin, vol. 48, No. 2, 1969, pp. 221-224.
Hsu et al, "Electrochemical Power and Hydrogen Generation from High Temperature Electrolytic Cells", Proceedings of the 11th Intersociety Energy Conversion Engineering Conference.
Babbitt, "Arc Plasma Fabrication of Ferrite-Dielectric Composites," Ceramic Bulletin, Jun. 1976, pp. 566-568, 571.

Primary Examiner—James Derrington
Attorney, Agent, or Firm—Paul J. Cook

[57] ABSTRACT

Solid oxide electrolyte structures, e.g., flat plates, suitable for use in an electrochemical energy converter are prepared by a plasma deposition technique. This process is comprised of forming a suspension of the oxide powders, passing the suspension through an arc discharge to melt the oxide particles and depositing the molten particles on a substrate. The deposited layer is allowed to cool and then is removed intact from the substrate. The plate then can be sintered and a fuel electrode material and an oxidizer electrode material can be applied on the opposing surfaces of the plate.

5 Claims, 6 Drawing Figures

Fig. 6
PREPARATION OF SOLID OXIDE FUEL CELL DISCS

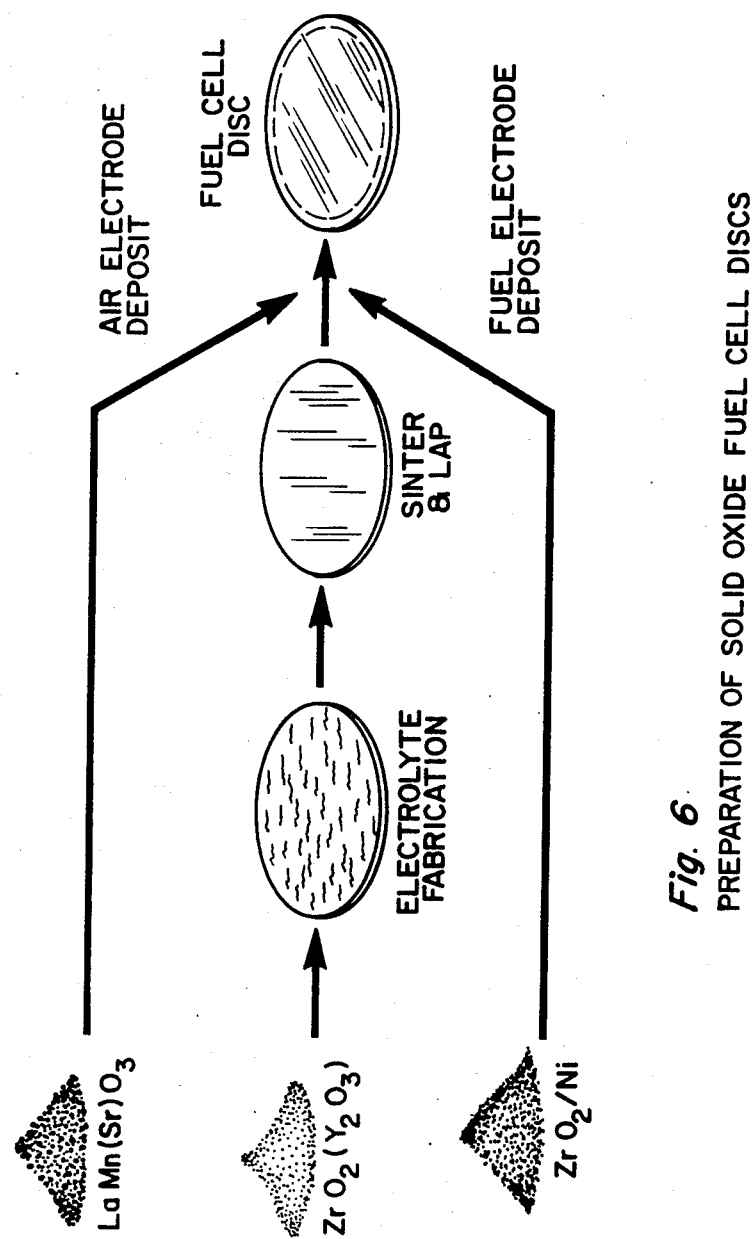
Fig. 6. PREPARATION OF SOLID OXIDE FUEL CELL DISCS

SOLID ELECTROLYTE STRUCTURE AND METHOD FOR FORMING

The Government has rights in this invention pursuant to Contract Number AF19(628)-78-C-0002 awarded by the U.S. Air Force.

This application is a continuation of application Ser. No. 382,035, filed May 26, 1982, now abandoned.

BACKGROUND OF THE INVENTION

This invention relates to a solid-oxide electrolyte structure useful in an electrochemical energy converter for fuel to electricity conversion under a fuel cell (electric generator) operating mode or electricity to fuel conversion under an electrolyzer (fuel synthesizer) operating mode and to a method for making the same. The converter is capable of yielding high efficiencies and depends only on the relation between free energy and enthalpy of the electrochemical reaction and is not limited by Carnot-cycle considerations.

A key component in an electrochemical energy converter is the electrolyte on which an oxidizer electrode and a fuel electrode are applied. The electrolyte must be an ionic conductor with acceptably low resistance and must be capable of transporting an ionic reaction species from one electrode-electrolyte interface to the opposite electrode-electrolyte interface under the operating conditions for the converter. It is well known that zirconia stabilized with oxides such as magnesia, calcia or yttria satisfies the requirements when operating at high temperature (about 1800° F. or about 1000° C.). This material utilizes oxygen ions to carry electrical current. The electrolyte should be electronically non-conducting in order not to short-circuit the converter. On the other hand, the electrode must be a good electron conductor. Interaction of the reacting gas, electrode and electrolyte occurs at the electrode-electrolyte interface which requires that the electrodes be sufficiently porous to admit the reacting gas and to permit exit of product gases.

Prior to the present invention, zirconia electrolyte as disclosed by U.S. Pat. No. 3,460,991 has been shaped in tubular configuration. It has proven to be mechanically delicate, prone to fraction under thermal cycling and has low volumetric power density. The design disclosed by U.S. Pat. No. 3,554,808 adopts planar configuration for the fuel cell batteries. However, the in-situ sintering of components in constructing a stack of these planar zirconia electrolytes has proven difficult.

An approach to overcome these problems by forming the electrolyte in free-standing plates was disclosed by Hsu, et al, in the Proccedings of the 11th Intersociety Energy Conversion Engineering Conference, in the article entitled "Electrochemical Power and Hydrogen Generation from High Temperature Electrolytic Cells". This attempt has not been successful primarily due to the fact that the surface of the electrolyte has a corrugated shape which was utilized to permit passage of fuel and oxidizer. This electrolyte configuration has proven to be very difficult to fabricate since it has a tendency to fracture while being shaped. In addition, this approach does not address the synergetic needs for electric contacts and gas seals between the adjacent plates in the stack assembly to achieve low loss, high operating efficiency. Furthermore, this design does not permit the use of air or other mixture of gases containing oxygen as no means are provided for removal of the product gas at the oxidizer side.

It would be desirable to provide a solid oxide electrochemical converter which is feasible to construct, rugged in operation and handling, flexible in fuel or oxidizer selections and which provides low electrical or fuel losses.

SUMMARY OF THE INVENTION

In accordance with this invention, a flat plate of a solid-oxide electrolyte is provided which is coated on one flat surface with the porous oxidizer electrode and on the opposing flat surface with the porous fuel electrode. The plates generally have a thickness between 0.005 and 0.015 inches, while the porous electrodes have a thickness between 0.002 and 0.005 inches. In forming the plates of the solid-oxide electrolyte of this invention, oxide powders as raw materials are used in conjunction with plasma spray technique which is a widely used method for applying protective coatings against corrosion or wear. A substrate such as copper, aluminum or graphite is used as the foundation of the deposit. The surface of the substrate is conditioned with respect to its roughness to arrive at proper level of adhesion which must be sufficient for the attachment of initial deposit to the substrate while still permitting easy release for the final product from the substrate. Wedging, impact and thermal shrinkage are methods which can induce the separation to produce free-standing plates. The plates are then sintered at elevated temperature for densification and relief of thermal stress which is likely introduced during the plasma spray process. The product as sprayed has a density approaching 90% of its theoretical value. Sintering contributes another ~6% densification which corresponds to ~2% linear shrinkage. This low shrinkage makes precision shaping and dimension control possible. Electrode materials can then be applied. A flame powder spray technique has proven to offer electrode coatings with suitable porosity and remarkable adhesion between the electrode coatings and the electrolyte plate.

BRIEF DESCRIPTION OF THE DRAWINGS

FIG. 6 is a flow diagram of the steps in preparation of solid oxide fuel cell discs.

DESCRIPTION OF SPECIFIC EMBODIMENTS

Figure 1:
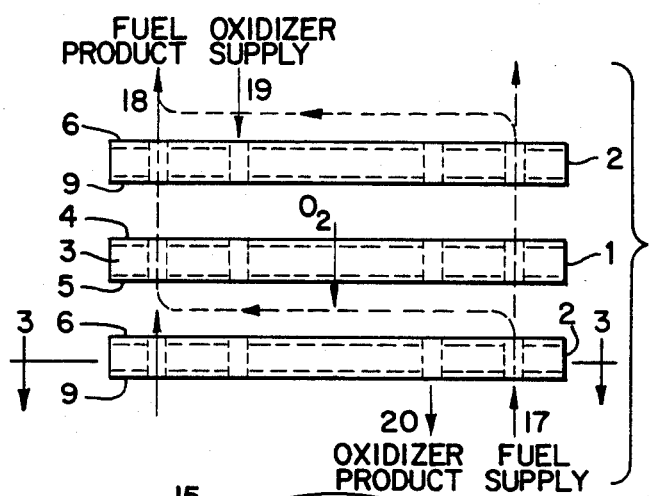
FIG. 1 is a cross-sectional view of the electrochemical cell stack utilizing the structure of this invention.

The solid-oxide electrolyte plates of this invention are prepared using oxide powder in conjunction with plasma-deposition technique. Oxide particles are first suspended in a working gas such as nitrogen or argon and the suspension then is passed through an arc discharge. The oxide particles are heated by the discharged gas to their molten state and ejected from a nozzle onto a substrate, such as copper, aluminum or graphite, which has a shape corresponding to the desired configuration of the final solid-oxide plate. The surface of the substrate has a requisite degree of roughness which allows particles to adhere until a continuous coating of the desired thickness is obtained while permitting subsequent removal of the electrolyte plate by thermal or mechanical means which do not cause damage to the solid-oxide plate. Suitable roughness or irregularities of the substrate surface can be achieved using blast of glass beads. Generally, the degree of roughness which desired are irregulariries between about $32\mu$ inch and about $64\mu$ inch (0.00032-0.00064 inches) in size. The solid-oxide plate so obtained has a density approaching about 90% theoretical density. The solid-oxide plate then is sintered at a temperature between about 1400° C. and about 1600° C. to allow stress relief and further densification. During sintering, the solid-oxide plate experiences a linear shrinkage of about 2% which results in a product approaching 96% theoretical density. Hereafter, the fuel electrode and oxidizer electrode are deposited on opposite sides of the electrolyte plate by flame deposition technique which produces coatings of a desired porosity of about 30-40%.

In summary, the fabrication of solid-oxide electrolyte plates is composed of six key steps: (1) substrate preparation, to obtain suitable level of adhesion between the substrate and the solid-oxide coating layer; (2) plasma deposition, to establish an initial layer which adheres to and thus conforms to the substrate surface; (3) continued plasma deposition, to build up to the desired thickness over the desired shape; (4) separation, to free the solid-oxide thin structure from the substrate by mechanical impact or thermal soak which induces an interface stress in exceeding the adhesion strength; (5) sintering (1400° C. to 1600° C.), to provide relief of stress which is introduced in the step (3) during the thickness build-up; (6) flame deposition, to provide porous electrode coatings.

Generally, the solid-oxide electrolyte plate so produced has a thickness of 0.05 to 0.015 inches. The electrodes have thicknesses of 0.002 to 0.005 inches. This technique allows the fabrication of electrolyte plate structure of up to 10 inches in diameter and permits the formation of various complex shapes, such as corrugated disks, disks with holes and flanges, or flat disks. This contrasts with conventional available technology which utilizes isostatic formation or green-tape method followed by sintering. These methods can only produce flat zirconia disks of about 0.05 inch thick and a maximum of about 2 inch diameter. The limitation of these conventional methods to produce thinner and larger products lies in excessive size reduction during the sintering which results in intolerable amounts of distortion and ceramic structure failure.

The electrolyte plate structure of this invention can be utilized in an electrochemical energy converter wherein the electrolyte plates are stacked with electrical conductor plates in alternating relationship. The electrolyte plates are made of zirconia in mixture with magnesia, calcia or yttria to acquire good oxygen-ion transport property. Opposing flat surfaces of these zirconia electrolyte plates are coated respectively with a fuel electrode material and an oxidizer electrode material. Suitable oxidizer electrode materials include perovskites, such as $LaMnO_3(Sr)$. Suitable fuel electrode materials include cermets such as $ZrO_2/Ni$. The conductor plate is formed from a heat resistant electrical conducting material such as Inconel or cermets such as $ZrO_2/Ni$. Both the conductor and electrolyte plates are provided with holes as the passages for fuel, oxygen-containing gases, which are introduced into the stack and as the passages for product gases which are removed from the stack.

When operating as a fuel cell, the electrolyte and conductor plates are shaped to cooperate with the transverse holes so that oxygen is introduced only on the surface of the electrolyte plate having the oxidizer electrode material, while the fuel is introduced only on the surface of the electrolyte plate having the fuel electrode material. The conductor and electrolyte plates are held in tight relationship about their circumference by means of rods which extend through holes in the stack in order to minimize leakage of gas out of sides of the stack. Alternatively, the stack could be clamped in order to prevent this leakage. In one embodiment of this invention, the stack is provided with a heat exchange device formed integrally with the stack which exchanges heat between the outgoing product gas and the incoming fuel gas and oxygen-containing gas prior to the oxygen-containing gas entering the electrochemical energy connectors. This is because it is desirable to achieve high conductivity of the electrolyte generally within the range of about 900° and about 1100° C., preferably about 1000° C. By operating with the heat exchanger, thermal efficiencies can be improved. Generally, the heat exchanger comprises a series of two alternating sets of plates, one set being flat and the other set having ridges in a pattern such as is used for the conducting plates in the electrochemical energy convertor. The incoming gas passes along one surface of the plates having ridges, the outgoing gas passes separately along the opposite surface of the plate having ridges so that the incoming gas becomes heated prior to entering the electrochemical energy connector.

Figure 2:
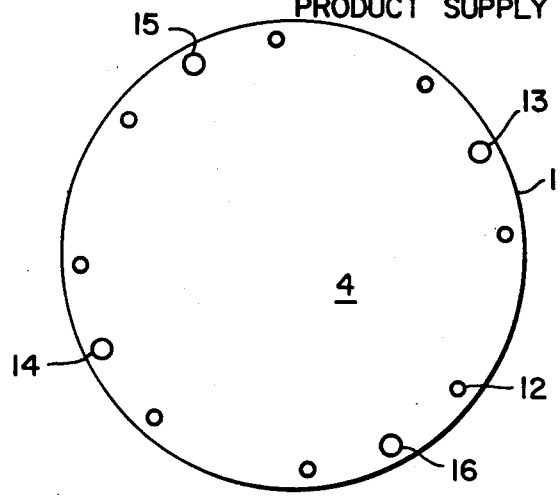
FIG. 2 is a top view of the structure of this invention utilized in the stack of FIG. 1.
Figure 3:
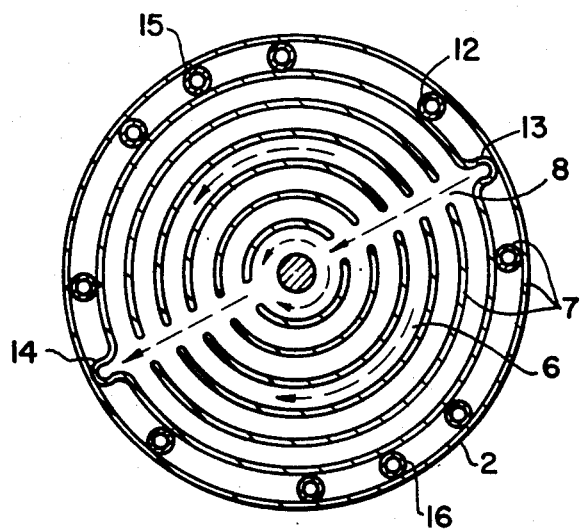
FIG. 3 is a top view of the electrical conductor used in cell stack of FIG. 1.

This invention will be fully explained with reference to the accompanying drawings. Referring to FIGS. 1, 2 and 3, the basic cell unit in the electrochemical cell stack comprises single electrolyte plate 1, and single conductor plate 2. The electrolyte plate 1 is made of stabilized zirconia $ZrO_2.(Y_2O_3)$, component 3, on which porous oxidizer electrode 4 and porous fuel electrode 5 are coated. Preferred materials for oxidizer electrodes are perovskites such as $LaMnO_2(Sr)$. Preferred materials for fuel electrodes are cermets such as $ZrO_2/Ni$. The conductor plate 2 is made of metal such as Inconel or cermets such as $ZrO_2/Ni$. It serves as: electric connection between adjacent electrolyte plates 1; gas partitions to achieve unipolar stack; and heat conduction path between electrode surfaces 4, 5 and the edge of the plates 1, 2.

Fuel supply is fed to the stacked cell unit through axial (with respect to the stack) manifold 17 provided by holes 13 and its product is exhausted through manifold 18 provided by holes 14. Fuel is distributed over the fuel electrode surface 5 through in-plane groove network 6 formed in the upper surface of the conductor plate 2. Notches 8 made in ridges 7 provide openings connecting manifold 17, 18 through holes 13, 14 to fuel electrode 5. Oxidizer is fed to the stacked cell unit through manifold 19 provided by holes 15 and its product is exhausted through manifold 20 provided by holes 16. Oxidizer is distributed over the oxidizer electrode surface 4 through in-plane groove network 9 formed in the lower surface of the conductor plate 2 of the adjacent cell unit. Notches similar to notches 8 in ridges similar to ridge 7 provide openings connecting manifolds 17, 18 through holes 13, 14 to oxidizer electrode 4. The ridges 7 and 10 forming side walls of the groove networks 6 and 9 on the conductor plates 2 are brought in contact with electrolyte plates 1 in stack assembly. The ridges 7 and 10 are pressed against the porous electrode 5 and the electrode 4 of the adjacent cell unit, respectively, in assembly to achieve electrical contacts. The ridges at the outer edge of the conductor plates 2, the ridges along the edge of bolt holes 12, the ridges along the edge of the upper surface of the conductor plates 2 around the holes 15, 16 and the ridges of the lower surface of the conductor plates 2 around the holes 13, 14 are brought in contact with surface coating which has identical structure as the electrode coatings. These circumferential ridges which are not notched are pressed against the porous coating 4, 5 in assembly to achieve gas seals. Water-cooled tension rods (not shown) which are concealed in bolt holes 12 are used to provide the assembly force.

Figure 4:
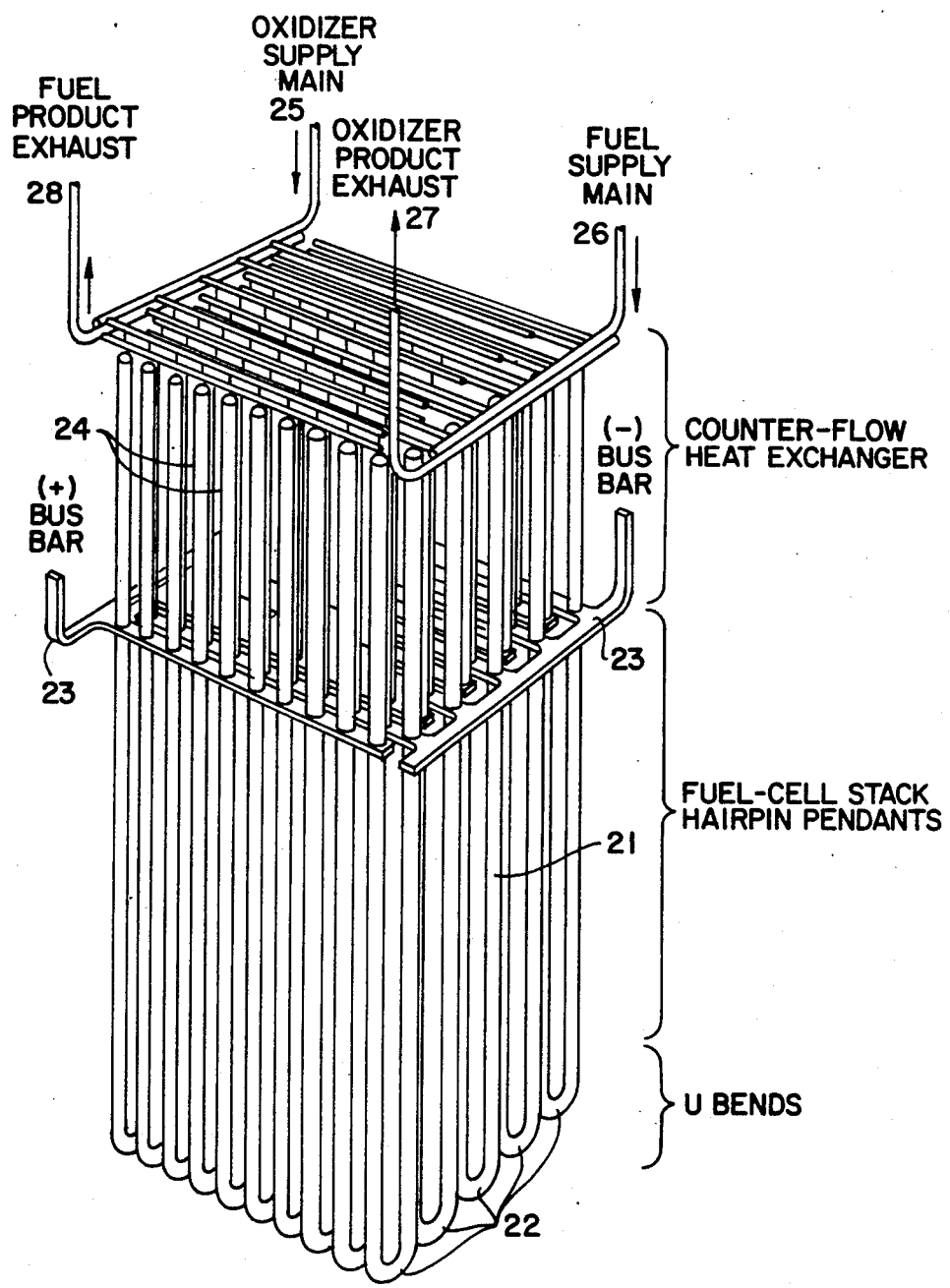
FIG. 4 is an isometric view of an electrochemical energy converter utilizing the structure of this invention, which includes a heat exchanger.

Referring to FIG. 4, the electrochemical cell stacks can be paired to form hairpin pendants 21 with U bends 22 to achieve better structural rigidity and more convenient one-side terminations for gas manifolding and electric connections. Bus bars 23 are provided to tap or supply electricity to the electrochemical pendants 21 which are in multiple parallel electrical connections.

Figure 5:
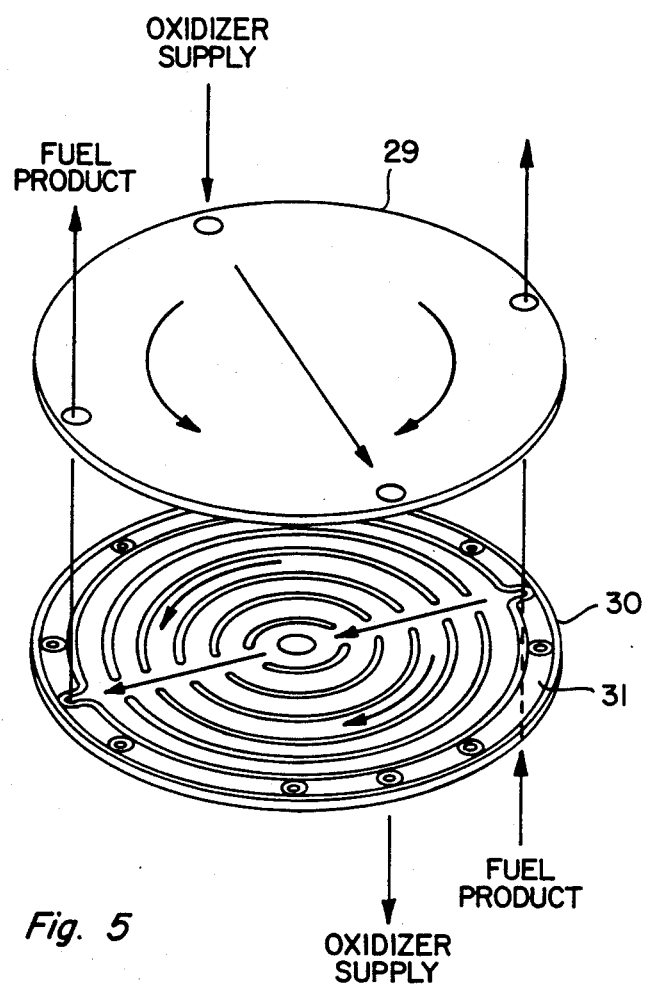
FIG. 5 is an isometric view of the components forming the heat exchanger section of the inverter.

The electrochemical cells operate efficiently at an elevated temperature ($\sim 1800°$ F. or $\sim 1000°$ C.). Heat exchanger stacks 24 are provided and placed at the top of the electrochemical cell stacks. The heat exchanger serves as: thermal conduction buffer between hot electrochemical cell stacks 21 and external structures; and gas temperature conditioners which heat the incoming reacting gases by the outgoing product gases with a counter-flow scheme, as shown in FIG. 5. The heat exchanger stack 24 is constructed from flat heat exchanger plates 29 which are arranged in alternating layers with partition plates 30. Internal passages for feeding and exhausting of gases, and groove networks for distributing gases over heat exchanger plates are provided in designs identical to that in the electrochemical stack. Ridges 31 on partition plates 30 are pressed against the flat surfaces of the adjacent heat exchanger plates 29 to define gas flow patterns and gas seals. As shown in FIG. 5, the oxidizer supply passes across the top surface of a heat exchanger plate 29 while fuel product passes across the bottom surface of heat exchanger plate 29 and the top surface of partition plate 30. An indirect heat transfer occurs across the thickness of heat exchanger plate 29. The heat transfer efficiency is determined by the dimensions of the grooves in the partition plate 30, thickness of heat exchanger plate 29 and its thermal property. At high temperatures (over 900° F. or 500° C.) Inconel or a ceramic such as alumina is required for the construction of the heat exchanger.

The oxidizer supply main 25, fuel supply main 26, and product exhaust 27, 28 are located at the low temperature ends of the heat exchanger stacks 24. Water-cooled tension rods concealed in bolt holes 12, as described, are used to assemble the electrochemical cell units together with the heat transfer plates. Spring loading is utilized to accommodate thermal expansions in thickness of the plates. Springs (not shown) are located at the low temperature ends of the heat exchanger stacks 24.

It is to be understood that the apparatus of this invention can be utilized as fuel cells (electric generator) when gaseous fuel is supplied or be applied as electrolyzer (fuel synthesizer) when electricity is applied. It is applicable to all reversible reactions involving exchanging of oxygen such as:

$$H_2 + \frac{1}{2} O_2 \rightleftarrows H_2O$$

$$SO_2 + \frac{1}{2} O_2 \rightleftarrows SO_3$$

$$CO + \frac{1}{2} O_2 \rightleftarrows CO_2$$

and $$NH_3 + \frac{5}{4} O_2 \rightleftarrows NO + \frac{3}{2} H_2O$$

We claim:
1. The process for forming a solid-oxide electrolyte plate which comprises suspending powders of said oxide in a working gas, passing the suspension through an arc discharged to melt said particles and depositing said molten particle on a flat substrate, allowing said particles to cool and form a solid layer and removing said solid layer from said substrate, sintering said removed solid at a temperature between about 1400° C. and 1600° C., depositing a fuel electrode material on one surface of the sintered solid by flame deposition and depositing an oxidized electrode material on a second surface of the sintered solid, the degree of roughness of the surface of said flat substrate are irregularities between about 0.00032–0.000064 inches in size.

2. The process of claim 1 wherein said substrate is selected from the group consisting of copper, aluminum and graphite.

3. the process of claim 1 wherein, the plate has a thickness between about 0.005 and 0.015".

4. The process of claim 1 wherein, each electrode has a thickness of between about 0.002" and 0.005".

5. The process of claim 1 wherein said solid oxide comprises zirconia in admixture with an oxide selected from the group consisting of magnesia, calcia, yttria and mixtures thereof.

* * * * *